R. P. JACKSON.
MECHANICAL RECTIFIER.
APPLICATION FILED JUNE 9, 1914.

1,199,469.

Patented Sept. 26, 1916.

WITNESSES:
R. J. Fitzgerald
J. C. Davis

INVENTOR
Ray P. Jackson.
BY Wesley G. Carr
ATTORNEY

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MECHANICAL RECTIFIER.

1,199,469.  Specification of Letters Patent.  Patented Sept. 26, 1916.

Application filed June 9, 1914. Serial No. 843,950.

*To all whom it may concern:*

Be it known that I, RAY P. JACKSON, a citizen of the United States, and a resident of Edgewood Park, in the county of Allegheny and State of Pennsylvania, have invented a new and useful Improvement in Mechanical Rectifiers, of which the following is a specification.

My invention relates to mechanical rectifiers and it has for its object to provide a device of the character specified that will be effective in operation and substantially free from sparking throughout wide variations of load, frequency and wave form.

Figure 1:
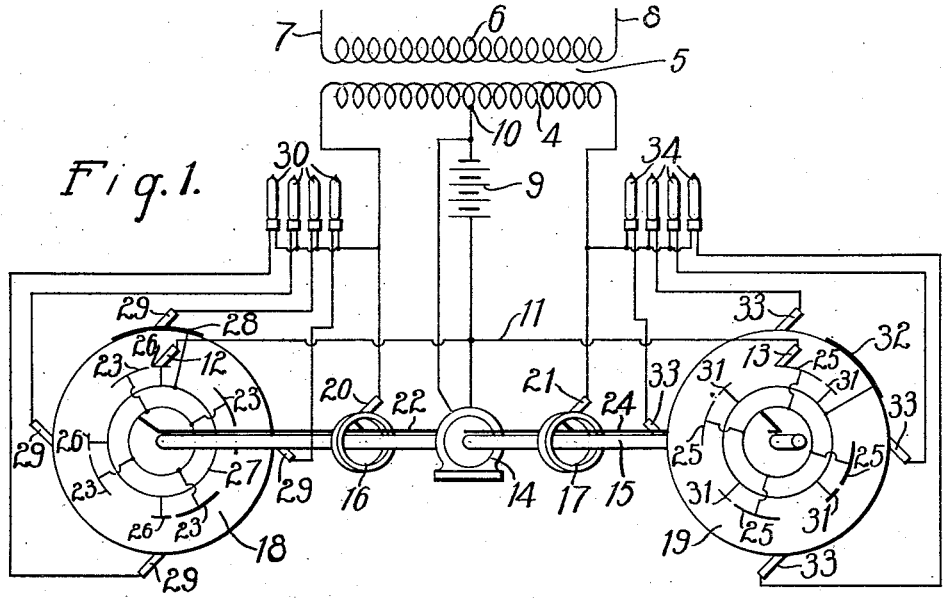
Figure 2:
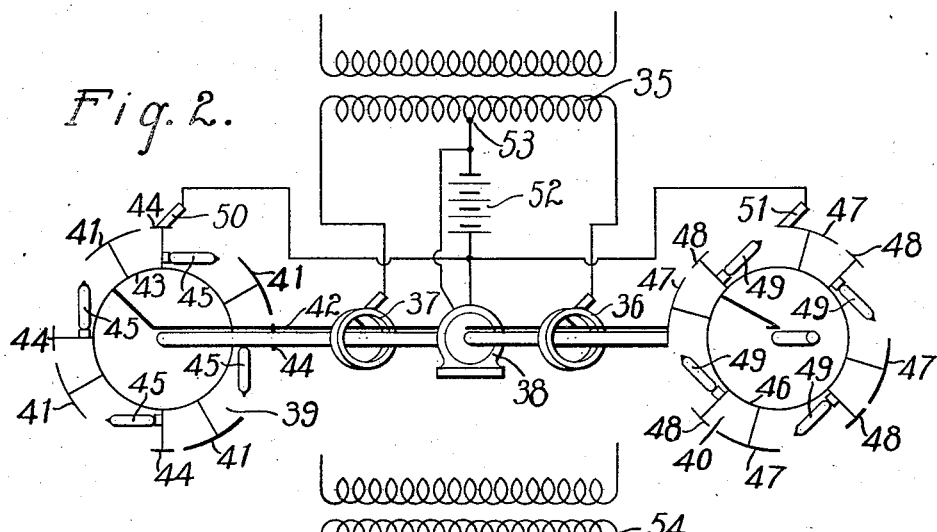
Figure 3:
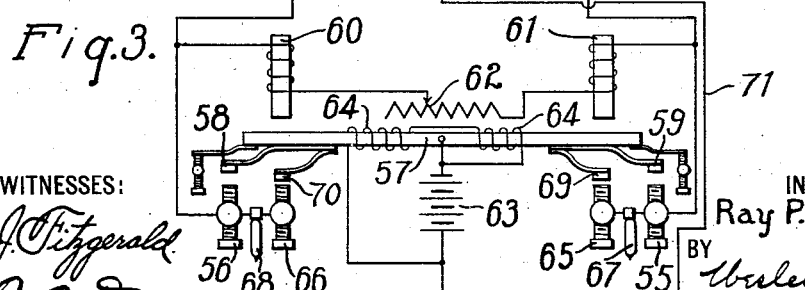

Referring to the accompanying drawing, Figure 1 is a diagrammatic view of one embodiment of my invention as applied to rectifiers of the rotating type; Fig. 2 is a diagrammatic view of a modified form of the system shown in Fig. 1; and Fig. 3 is a diagrammatic view of my invention as applied to a rectifier of the vibrating or Giglio type.

In the types of rotating and vibrating rectifiers which have been placed on the market heretofore, great difficulty has been experienced in preventing sparking when current flow is interrupted at the ends of current waves of the desired polarity. While it is possible to secure sparkless operation with constant load, frequency and wave form, if any of these factors change to any great extent, sparking may ensue. By my invention, I am enabled to obtain sparkless rectification throughout a wide range of variation in any of these factors.

Referring to the form of my invention shown in Fig. 1, 4 is any desired source of single-phase alternating current, such, for example, as the secondary winding of a transformer 5 having a primary winding 6 supplied from mains 7 and 8. A load 9, of any desired character requiring unidirectional current, such, for example, as a battery, is connected between the mid point 10 of the source 4 and a wire 11 connecting brushes 12 and 13. A synchronous motor 14 drives a shaft 15 in synchronism with the frequency of the source 4. The shaft 15 carries two slip rings 16 and 17 and two rectifying devices 18 and 19. Brushes 20 and 21, connected respectively to the terminals of the source 4, bear upon the slip rings 16 and 17. The slip ring 16 is connected to a conductor 22 mounted on the shaft, and the conductor 22 supplies alternating current to one terminal of the armature of the synchronous motor 14 and also to conducting segments 23 in the rectifying device 18. In a like manner, the slip ring 17 is connected to a conductor 24 mounted on the shaft and supplying alternating current to the other terminal of the armature winding of the synchronous motor 14 and to conducting segments 25 in the rectifying device 19. Direct current excitation for the synchronous motor 14 is derived from the battery 9 or from any other suitable source of direct current. Each of the four conducting segments 23 in the rectifying devices 18 extends over an arc somewhat less than 45° in length and, accordingly, the peripheral spaces intervening therebetween extend somewhat more than 45°. Conducting segments 26, of relatively short length, are disposed a short distance behind each of the conducting segments 23, for a purpose to be hereinafter pointed out.

The conducting segments 26 are all connected to a common conductor 27, which, in turn, is connected to a conducting segment 28 covering an arc of substantially 45°. Four brushes 29 are so mounted as to be successively engaged by the conducting segment 28, and each of the brushes 29 is connected to a terminal of a ballast lamp 30. The remaining terminals of the ballast lamps 30 are all connected to the left hand terminal of the source 4. Each of the ballast lamps 30 comprises a gas-tight container filled with hydrogen or other inert gas of high specific heat and good heat-conducting power, and within this gas is mounted a filament composed of a conductor of the first class, such, for example, as fine iron wire, which has a comparatively steep temperature-resistance characteristic. Any other type of resistance element having small heat capacity, high heat-radiating qualities and a rapidly rising temperature characteristic may be employed in place of the ballast lamps 30. In a similar manner, the rectifying device 19 is provided with small conducting segments 31, all of which are connected to a conducting segment 32 adapted to make contact successively with brushes 33 connected respectively to ballast lamps 34 which are, in turn, connected to the right hand terminal of the source 4.

Having thus described the construction of my device, the operation is as follows: Assuming the shaft 15 to be driven in synchronism with frequency of the source by the synchronous motor 14 and assuming the brushes and the conducting segments to be properly adjusted, a positive wave flowing from the right hand terminal of the source 4 through the brush 21, the slip ring 17 and the conductor 23 to the segments 25 will be permitted to flow through the load 9 because of the fact that the brush 13 has just come into contact with one of the segments 25. At the same instant, current flow of the preceding wave from the upper segment 23 to the brush 12 has just ceased and the brush 12 has come into engagement with the upper auxiliary contact 26. Accordingly, any energy that would manifest itself as a spark, because of the fact that the preceding current wave is lagging slightly, or because of the fact that the field of any inductive device in the circuit is collapsing, will be forced to traverse the conducting segment 28, the upper brush 29 and a corresponding ballast lamp 30. The flow of current in the ballast lamp causes an extremely rapid rise of the resistance therein and an extremely quick absorption of the energy of the current and its dissipation in heat. Accordingly, at the instant the brush 12 leaves the upper segments 26, there will be little or no energy to be dissipated in the form of a spark. In a similar manner, the auxiliary segments 31 in the rectifying device 12 will come into action at times when current flow from a wave is interrupted and serve to transmit any residual energy to the ballast lamps 34 where it is dissipated as heat. Thus, the rectifying devices 18 and 19 are alternately active, and effective means are provided for preventing sparking in each of them. In the particular construction set forth, the synchronous motor should rotate at one-quarter the frequency of the source and four cycles be rectified for each revolution of the rectifying device 18. It will thus be noted that each of the ballast lamps 30 is called upon to absorb the residual energy only at the end of each fourth cycle or of each eighth wave. During the intervening time, the resistance element therein will cool and its resistance will fall to a comparatively low value. Obviously, if the resistance elements in the ballast lamps do not cool sufficiently in the time given, the number of conducting segments may be greatly increased and the number of ballast lamps increased in proportion, so that any desired amount of time may be given said elements to cool between successive periods of activity.

Referring to the form of my device shown in Fig. 2, a source of alternating current 35 is connected to slip rings 36 and 37 driven by a synchronous motor 38, which also drives rectifying devices 39 and 40, all as in the device shown in Fig. 1. A plurality of main conducting segments 41 in the rectifying device 39 are connected directly to one terminal of the source 35 through the slip ring 37, a shaft conductor 42 and a conducting bond 43. Axially disposed behind each of the segments 40 is an auxiliary segment 44, and connected between these auxiliary segments and the conducting bond 43 are ballast lamps 45 mounted directly upon the rectifying device 39. In a similar manner, the rectifying device 40 is provided with a conducting bond 46, main conducting segments 47, and auxiliary conducting segments 48, the latter being connected to the bond 46 through ballast lamps 49. Brushes 50 and 51 are adapted to make contact with the segments 41, 44, 47 and 48, respectively, and are connected to one terminal of a load 52, the other terminal of which is connected to the mid point 53 of the source 35. When a current wave of the desired polarity is flowing through a main conducting segment in one of the rectifying devices, the brush in the other rectifying device is either bearing upon an auxiliary conducting segment or is bearing upon an insulating segment, and *vice versa*. Accordingly, after a brush has conducted the major portion of a current wave of the desired polarity, it passes to an auxiliary segment, and the last portion of the current wave, together with all other spark-producing current, is forced to traverse a ballast lamp and to have its energy absorbed therein. I consider the device shown in Fig. 2 preferable to that shown in Fig. 1, since the connections are much simpler, fewer brushes are employed, and the ballast lamps dissipate their heat much more quickly because they are moving rapidly through the air.

Referring to the form of device shown in Fig. 3, the terminals of a source of alternating current 54 are connected to adjustable contact members 55 and 56, respectively. A bar 57, of magnetic material, is pivotally mounted and carries two spring contact members 58 and 59 adapted to make contact, respectively, with the contact members 55 and 56. Two electromagnets 60 and 61 are disposed with like poles adjacent the respective ends of the bar 57. The electromagnets 60 and 61 are energized by alternating current from the source 54, and the phase angle of said current may be varied by an adjustable resistance element 62. The armature 57 is magnetized by direct current from any suitable source, such, for example, as a load battery 63, through the instrumentality of windings 64. Owing to the interaction between the unidirectional flux in the armature 57 and the alternating flux in the magnets 60 and 61, the armature 57 will be vibrated in synchronism with the source 54. The structure of Fig. 3 as disclosed to this point is not of my invention but is described and claimed in U. S. Patent No. 1,184,233, issued to the Westinghouse Electric & Manufacturing Company, May 23, 1916, on an application filed by Edgar Giglio. Mounted adjacent the contact members 55 and 56 are additional contact members 65 and 66. A ballast lamp 67 is connected between the contact member 55 and the contact member 65, and a ballast lamp 68 is connected between the contact member 56 and the contact member 66. The armature 57 carries two spring-mounted contact members 69 and 70 that are adapted to make contact, respectively, with the contact members 65 and 66. When the armature 57 is in the mid position, as shown, the adjustment is such that the contact members 69 and 65 are much closer together than are the contact members 55 and 59, and the contact members 66 and 70 are much closer together than are the contact members 56 and 58. Accordingly, when the armature 57 is vibrated, contact will be made between the members 65 and 69 earlier than it will be made between the members 55 and 59 and will be broken subsequently, and contact will be made between members 66 and 70 earlier than between members 56 and 58 and will be broken subsequently thereto. As is well known in the art, with devices of this character, current waves of the desired polarity will flow from the right hand terminal of the source 54 through the contact member 55 to the contact member 59, thence through the load 63 and returned to the mid point of the source 54 by a wire 71. Alternate waves will flow from the left hand terminal of the source 54 through the contact members 56 and 58 and the load 63 to the mid point of the source. At the instant that contact is broken between the members 56 and 58, slightly before the end of the current wave which is flowing, current will flow through the ballast lamps 68 and the contact members 66 and 70, and the break between members 56 and 58 will be shunted by a low resistance. Current flow being transferred to the ballast lamps, the resistance of the latter will rise with extreme rapidity and, at the time contact is broken between members 66 and 70, the current will have been reduced to such an extremely small amount, owing to the higher resistance of the member 68, at this time, that there will be practically no sparking between the members 66 and 70. A similar action will take place at the right hand end of the apparatus.

While I have shown my invention as embodied in three distinct forms, for purposes of illustration, I do not desire to have it restricted thereto but wish it to cover broadly any form of rectifier wherein a current path of low resistance is provided for waves of the desired polarity, and a resistance element having a steep temperature resistance characteristic, small heat capacity, and good heat radiating qualities is inserted in said path for an instant at or near the end of each current wave of the desired polarity.

I claim as my invention:

1. The method of preventing sparking in mechanical rectifiers which comprises inserting a resistance element composed of a conductor of the first class, in the current path during the latter portion of a current wave of the desired polarity, diminishing the flow of current by increasing resistance of said conductor, and then opening the current path.

2. The method of preventing sparking in mechanical rectifiers which comprises inserting a resistance element, composed of a conductor of the first class of small heat capacity and high heat dissipating capacity, in the current path during the latter portion of a current wave of the desired polarity, diminishing the flow of current by the increasing resistance of said conductor and then opening the current path.

3. The combination with a source of alternating current, of a load, a rectifying device comprising a plurality of main conducting segments and a rotatably mounted slip ring, the conducting segments being separated by spaces slightly longer than the segments themselves, a relatively small conducting segment associated with each main conducting segment and angularly displaced therefrom by a small amount away from the direction of rotation, low-resistance connections between the main segments and the slip ring, resistance elements comprising conductors of the first class of small heat capacity connected between each of the auxiliary segments and the slip ring, contacting means for the segments and the slip ring, and connections from one terminal of the source, through the rectifying device and load to another terminal of the source.

4. The combination with a source of alternating current, of a load, a rectifying device comprising a plurality of main conducting segments and a rotatably mounted slip ring, the conducting segments being separated by spaces slightly longer than the segments themselves, a relatively small conducting segment associated with each main conducting segment and angularly displaced therefrom by a small amount away from the direction of rotation, low-resistance connections between the main segments and the slip ring, ballast lamps connected between each of the auxiliary segments and the slip ring, contact means for the segments and the slip ring, and connections from one terminal of the source through the rectifying device and load to another terminal of the source.

5. The combination with a source of alternating current, of a load, means whereby current waves of but one polarity are allowed to pass from each terminal of the source through the load, and means for momentarily inserting a resistance element comprising a first class conductor of small heat capacity in the connection between a terminal of the source and the load during the last portion of flow from each desired current wave and for an instant thereafter.

6. The combination with a source of alternating current, of a load, means whereby current waves of but one polarity are allowed to pass from each terminal of the source through the load, and means for momentarily inserting a ballast lamp in the connection between a terminal of the source and the load during the last portion of flow from each desired current wave and for an instant thereafter.

In testimony whereof, I have hereunto subscribed my name this 23rd day of May, 1914.

RAY P. JACKSON.

Witnesses:
B. B. HINES,
A. M. LUNDY.